United States Patent [19]

Sano et al.

[11] Patent Number: 4,920,420
[45] Date of Patent: Apr. 24, 1990

[54] AUTOMATIC FOCUSING SYSTEM

[75] Inventors: Kenji Sano; Takesuke Maruyama; Hironobu Satoh; Masaharu Deguchi; Toshio Murakami, all of Yokohama, Japan

[73] Assignee: Hitachi, Ltd., Tokyo, Japan

[21] Appl. No.: 269,699

[22] Filed: Nov. 10, 1988

[51] Int. Cl.⁵ ............................................. H04N 5/232
[52] U.S. Cl. ............................. 358/227; 250/201 WD
[58] Field of Search ................ 358/227; 364/400, 402, 364/404; 250/201 AF

[56] References Cited

U.S. PATENT DOCUMENTS

| | | | |
|---|---|---|---|
| 3,617,633 | 11/1971 | Barr | 358/227 |
| 4,370,038 | 1/1983 | Kimura | 358/227 |
| 4,484,806 | 11/1984 | Onishi et al. | 358/227 |
| 4,611,244 | 9/1986 | Hanma et al. | 358/227 |
| 4,706,124 | 11/1987 | Baba et al. | 358/227 |
| 4,745,484 | 5/1988 | Drexler et al. | 358/227 |

FOREIGN PATENT DOCUMENTS 60-42723 3/1985 Japan .

OTHER PUBLICATIONS

National Technical Report, vol. 31, No. 6, (pp. 821-823).

Primary Examiner—Jin F. Ng
Assistant Examiner—Stephen Brinich
Attorney, Agent, or Firm—Antonelli, Terry & Wands

[57] ABSTRACT

There is provided an automatic focusing system which is used in a video camera or the like. A master lens is finely vibrated and moved by using a moving mechanism consisting of a stepping motor and a lead screw. A speed control circuit to set a moving speed of the master lens is provided. The moving speed of the master lens is set by an output signal of the speed control circuit and the master lens is moved by the moving mechanism. The moving speed of the master lens is optimally controlled and the out-of-step phenomenon in the stepping motor is eliminated. Since the master lens is accurately moved, the focusing operation is executed at a high accuracy. In addition, the influence by the unnecessary vibration (ringing) which is caused by the sudden change in moving speed of the master lens is eliminated. Therefore, since the master lens normally performs a predetermined micro vibration, the correct focusing can be accurately discriminated. Further, when a change in amount of the high frequency component of a video signal is large, since the moving speed of the master lens increases, the operating time until the correct focus is obtained is reduced.

5 Claims, 12 Drawing Sheets

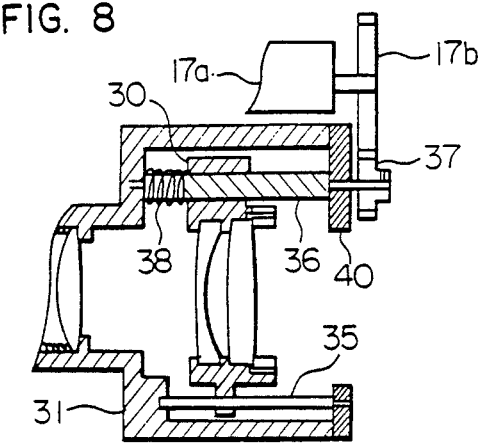
FIG. 8
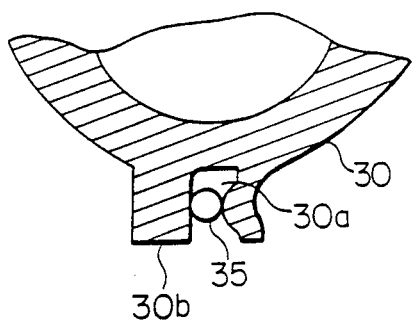
FIG. 9
FIG. 10
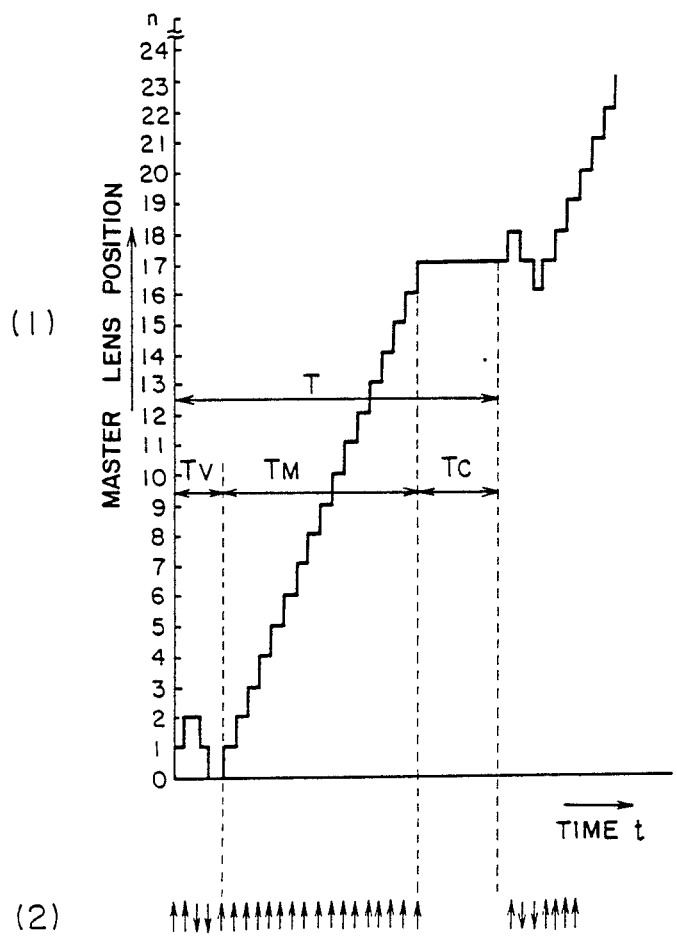

AUTOMATIC FOCUSING SYSTEM

BACKGROUND OF THE INVENTION

The present invention relates to an automatic focusing system of a video camera or the like and, more particularly, to an automatic focusing system in which a master lens group of the lens system is finely vibrated in the optical axis direction, a high frequency component (focus voltage) is detected from a video signal obtained by an image pickup device, and a moving mechanism to move the master lens group is controlled so that a magnitude (amount) of the high frequency component becomes maximum.

Hitherto, as one of automatic focusing systems attached to video cameras and the like, there has been known a system disclosed in U.S. Pat. Ser. No. 4,611,244.

Such a conventional automatic focusing system comprises: means for generating an automatic focusing signal according to the lens position of the lens system of a video camera; a motor to move a part or all of a master lens group of the lens system; motor drive control means for performing an automatic focusing operation by controlling the driving of the motor in accordance with the automatic focusing signal; switching means which is switched between first and second modes to select either a photographing mode in an ordinary distance range or a photographing mode in a macro distance range; and master lens moving range control means for selecting a movable range of the master lens in accordance with the mode of the switching means and for controlling the motor drive means so as to move the master lens within the selected moving range.

According to this system with such a construction, the focusing operation is performed by moving the master lens and the moving range of the master lens in the photographing in the ordinary distance range and the moving range of the master lens in the photographing in the macro distance range are made different, thereby enabling the photographing in the macro distance range of the video camera to be performed. In the case of performing the focusing operation by using both of an objective lens which is fixed to a predetermined position and a master lens which is moved (deviated) by a moving mechanism, the moving mechanism can be miniaturized and reduced in weight than the case of using an objective lens which is moved by the moving mechanism. This is because the objective lens is generally larger and heavier than the master lens.

On the other hand, such a conventional automatic focusing system includes an image pickup device for converting a two-dimensional optical image formed by the lens system into a time-sequential electric signal (video signal) and a camera circuit. The high frequency component corresponding to the fineness of the optical image (image) is extracted from the video signal by a high pass filter. Further, the signal of the high frequency component is detected by a detector and converted into a focus voltage which is proportional to a magnitude (amount) of the high frequency component signal.

Therefore, the focus voltage depends on the fineness of the optical image and becomes maximum when the optical image is accurately focused. As shown in FIG. 1, assuming that an object to be photographed is located at the position which is away from the video camera by A (m), the focus voltage becomes maximum when a scale position for adjustment of the distance of the master lens exists at the position of A (m) and decreases as the scale position is deviated from A (m). As will be understood from FIG. 1, the focusing operation is automatically performed if the position of the master lens is set so that the focus voltage becomes a maximum value.

In the conventional automatic focusing system, a difference detector circuit is provided to set the focus voltage so as to become maximum. In the difference detector circuit, the focus voltage is sampled and held every predetermined time and a positive voltage is generated when the focus voltage increases with an elapse of time, while a negative voltage is generated when the focus voltage decreases with an elapse of time.

An output voltage of the difference detector circuit corresponding to the focus voltage is shown in FIG. 1 together with the focus voltage. The master lens is moved in the direction in which it is at present set when the output voltage of the difference detector circuit is positive. The master lens is stopped when the output voltage changes from the positive value to a negative value. (Practically speaking, the master lens is finely vibrated at the position near the maximum value of the focus voltage.)

The conventional automatic focusing system automatically executes the focusing operation as explained above. However, in this first conventional example, nothing is disclosed with respect to the practical moving mechanism of the master lens (although there is a disclosure of a motor) and, further, nothing is also disclosed with respect to the moving speed of the master lens.

Next, as a second conventional example, there is a system disclosed in a paper entitled "VHS Movie Cameras NV-M1 and NV-M3" disclosed in National Technical Report, Vol. 31, No. 6, pages 812 to 823, published on December, 1985.

An automatic focusing system similar to that disclosed in the foregoing U.S. Pat. Ser. No. 4,611,244 is disclosed at page 822 in that paper. For instance, FIG. 2 in this paper shows a change in high frequency component to a deviation of a focal point of an optical image which is caused due to a change in optical path length between an object to be photographed and a photo sensing surface of an image pickup device due to a micro vibration (constant amplitude) of the master lens.

As shown in FIG. 2, the micro vibration component of the high frequency component does not change at the focal position in the case where the master lens was finely vibrated, and the phases of the changes in the improper focus states of the before-focal point and after-focal point differ by 180°. In this case, an amplitude of micro vibration component corresponds to a magnitude of output voltage of the difference detector circuit in the first conventional example. On the other hand, a phase of micro vibration component similarly corresponds to a polarity of output voltage of the difference detector circuit.

Therefore, in the second conventional system, the phase of the micro vibration component is detected by using the change in optical path length as a reference, the moving direction of the focusing lens is determined from the phase of the micro vibration component, a point at which the amplitude of the micro vibration component becomes zero is detected, and by using that the point of the zero-amplitude corresponds to the position of the maximum value of the high frequency component, the movement of the lens is stopped. In this conventional system, an objective lens is used as the focusing lens.

A third conventional system for performing the focusing operation by changing the optical path length and by moving the objective lens in a manner similar to the second conventional example is disclosed in JP-A-60-42723.

In the second and third conventional examples, since both of the objective lens and master lens are moved (vibrated), there are problems such that the moving mechanism is complicated and its size and weight are large. On the other hand, similarly to the first conventional example, nothing is also disclosed with respect to the moving speed of the object lens or the like.

A fourth system to improve the foregoing problems in the second and third conventional examples is also further proposed. According to the fourth system, the master lens is moved in a manner similar to the first conventional example while finely vibrating it. Thus, the moving mechanism can be simplified and the automatic focusing system can be reduced in size and weight.

The fourth conventional example is disclosed in Japanese Patent Application No. 62-24586 (corresponding to U.S. Pat. Application No. 151,963 filed on Feb. 3, 1988).

According to the fourth automatic focusing system, a focusing mechanism is provided in the rear portion of a variator lens of the zoom lens system of a video camera and this focusing mechanism is moved while it is being finely vibrated at a predetermined reference frequency. On the other hand, according to this system, the high frequency component is extracted from the video signal derived from the image pickup device and the micro fluctuation component corresponding to the micro fluctuation of the reference frequency is detected from the high frequency component. The focusing mechanism is driven by a motor in accordance with the polarity and amplitude of the micro fluctuation component detected. Thus, in a manner similarly to the case of FIG. 2, the high frequency component signal (focus voltage) has the maximum value and the focusing operation is automatically executed.

The fourth conventional system will now be described in more detail with reference to FIGS. 3 and 4

FIG. 3 is a block diagram of an embodiment of an automatic focusing system according to the fourth conventional system.

In this automatic focusing system, the master lens is moved while it is finely vibrated.

In FIG. 3, reference numeral 1 denotes a lens system of a video camera; 2 is an objective lens fixed to a predetermined position; 3 a variator lens to change a magnification of the lens system 1 in a zooming mode; 4 a compensator lens which is moved in the zooming mode and corrects a focusing deviation during the zooming operation for an object to be photographed; 5 a diaphragm apparatus; 6 a master lens; and 7 an image pickup device in which an optical image is formed on the photo sensing surface by the master lens 6.

Reference numeral 17 denotes a stepping motor which is driven by an input pulse and rotates its rotating shaft in accordance with a period and a phase of the pulse. Reference numeral 19 denotes moving means for holding the master lens 6 and moving the master lens 6 in the optical axis direction of the lens system 1 while allowing it to be finely vibrated. Reference numeral 18 indicates a gear to propagate the rotational force of the rotating shaft of the stepping motor 17 to the moving means 19. The rotation of the motor 17 is converted into the rectilinear motion in the optical axis direction of the master lens 6.

Reference numeral 12 represents a control circuit having a reference signal generating source 13, a control signal generating circuit 14, and a sync detecting circuit 15. The reference signal generating source 13 generates a reference frequency signal to finely vibrate the master lens 6 at a predetermined period. The reference frequency signal generated from the reference signal generating source 13 is supplied to the control signal generating circuit 14 and sync detecting circuit 15. The control signal generating circuit 14 generates a control signal to move the master lens 6 while finely vibrating the master lens on the basis of both of the reference frequency signal supplied from the reference signal generating source 13 and a signal supplied from the sync detecting circuit 15. This control signal is supplied to a drive circuit 16.

The drive circuit 16 drives the stepping motor 17 on the basis of the control signal supplied from the control signal generating circuit 14 in the control circuit 12. The stepping motor 17 is driven by an output of the drive circuit 16. The master lens 6 moves while finely changing the focusing state at such a fine degree that cannot be detected by the human eyes. Therefore, an output signal of the image pickup device 7 also finely changes in correspondence to the micro vibration of the master lens 6.

Reference numeral 8 denotes a preamplifier to amplify the output signal of the image pickup device 7. An output signal of the preamplifier 8 is supplied to both of a camera circuit 9 and a high frequency component extracting circuit 10. The camera circuit 9 makes a video signal on the basis of the output signal of the preamplifier 8. The camera circuit 9 outputs the video signal to the outside of the video camera main body.

The high frequency component extracting circuit 10 extracts the signal of the high frequency component from the output signal of the preamplifier 8 and outputs. The high frequency component signal includes the signal corresponding to the micro vibration of the master lens 6 since the focusing state finely changes. Reference numeral 11 denotes a detecting circuit to detect a signal of the micro vibration component from an output signal of the high frequency component extracting circuit 10. The detecting circuit 11 outputs the detected signal to the sync detecting circuit 15 in the control circuit 12.

The sync detecting circuit 15 synchronously detects an output signal of the detecting circuit 11 by using the reference signal supplied from the reference signal generating source 13. By this synchronous detection, the polarity and amplitude of the output signal of the detecting circuit 11, that is, the polarity and amplitude of the micro vibration component in the high frequency component of the video signal are detected. The detection signal of the polarity and amplitude is supplied to the control signal generating circuit 14. Thus, the control signal generating circuit 14 outputs the control signal so as to make the magnitude of the high frequency component of the image pickup device 7 maximum, thereby allowing the focusing operation to be automatically performed in a manner similar to the second conventional system.

The fourth conventional system is not limited to the case of using the stepping motor. It is preferable to use a motor such as stepping motor, ultrasonic motor, or the like which is driven by pulses.

FIG. 4 shows a conceptional diagram in the case where the master lens 6 is moved while it is finely vibrated in the fourth conventional system.

In FIG. 4, FIG. 4(1) shows a graph in which an axis of abscissa denotes a time t and an axis of ordinate indicates a position of the master lens 6. The position of the master lens 6 is indicated by values which are obtained by dividing the distance from the infinite distance ∞ to the close range into n steps. FIGS. 4(2) and 4(3) show a timing and a phase (indicated by the direction of an arrow) of an input pulse to rotate the stepping motor 17 every step in FIG. 4(1). FIG. 4(2) corresponds to the operation shown by a broken line in FIG. 4(1). FIG. 4(3) corresponds to the operation shown by a solid line in FIG. 4(1).

As will be understood from FIG. 4, the input pulses which are input to the stepping motor 17 have a predetermined period. The position of the master lens 6 is shifted by only 1/n every time the input pulse is input to the stepping motor 17. On the other hand, in the case of the solid line in FIG. 4(1), after the fine deviation of one cycle (period: $T_V$) was performed with an elapse of the time t, a deviation is performed by one step in a period of time $T_M$. In the case of the broken line, after the fine deviation of one cycle (period: $T_V'$) was performed, the deviation is performed by only three steps in a period of time $T_M'$. The micro deviation of the master lens 6 of one cycle indicates that the master lens 6 is finely vibrated. Further, a in FIG. 4 denotes the case where the number of input pulses is increased in a predetermined period.

In FIG. 4, it should be noted that the input pulses (drive pulses) to the stepping motor 17 have a predetermined period.

This means that the moving speed of the master lens 6 is constant.

A typical driving method of the stepping motor and a typical control method of the rotating speed of the stepping motor will now be described with reference to FIGS. 5 and 6.

FIG. 5 is a diagram showing a typical stepping motor and a signal of a current which is supplied to a drive circuit of this motor. In FIG. 5(1), a CLK signal consisting of a pulse train and a CW/CCW signal indicative of a forward/reverse rotation of the motor are supplied from an external circuit (not shown) to the drive circuit 16. Upon reception of these signals, the drive circuit 16 outputs signals $\phi_1$ to $\phi_4$ of currents of four phases to a stepping motor 17a. Upon reception of the signals $\phi_1$ to $\phi_4$, the stepping motor 17a rotates its rotating shaft in accordance with the states of the signals $\phi_1$ to $\phi_4$. The signals $\phi_1$ to $\phi_4$ are supplied to an exciting coil (not shown) of the stepping motor 17a.

FIG. 5(2) shows the relations among the CLK signal which is supplied to the drive circuit 16 and the signals $\phi_1$ to $\phi_4$ which are output from the drive circuit 16 in the case where the CW/CCW signal indicates the forward rotation (clockwise rotation) of the motor. As will be understood from FIG. 5(2), for the signals $\phi_1$ to $\phi_4$, the signal $\phi_1$ is first output synchronously with the CLK signal and the other signals $\phi_2$ to $\phi_4$ are sequentially output in accordance with this order. The signal $\phi_1$ is again output after the signal $\phi_4$ was output. In this manner, when the current signals $\phi_1$ to $\phi_4$ are sequentially repetitively output in accordance with the order of the signals $\phi_1$ to $\phi_4$, the rotating shaft of the stepping motor 17a rotates forwardly. On the contrary, FIG. 5(3) shows the relations among the CLK signal and the signals $\phi_1$ to $\phi_4$ in the case where the CW/CCW signal indicates the reverse rotation (counterclockwise rotation). The signals $\phi_1$ to $\phi_4$ are repetitively output synchronously with the CLK signal in accordance with the order from the signal $\phi_4$ to the signal $\phi_1$. When the signals $\phi_1$ to $\phi_4$ are output in this manner, the rotating shaft of the stepping motor 17a rotates reversely.

FIG. 6 is a diagram showing a typical speed control method of a rotating speed in the case of driving the stepping motor. The speed control method shown in FIG. 6(1) is called a trapezoidal control system. The trapezoidal control system is used to prevent that when the drive circuit 16 outputs the signals $\phi_1$ to $\phi_4$ to rotate the rotating shaft of the stepping motor 17a, a rotor (not shown) connected to the rotating shaft cannot follow a change in supply of the signals $\phi_1$ to $\phi_4$. A phenomenon such that the rotating shaft does not normally rotate because the rotor cannot follow due to the inertia is called an out-of-step phenomenon. On the other hand, the trapezoidal control system is used to prevent that when the stepping motor 17a stops the rotation of the rotating shaft, the unnecessary vibration (ringing) of the rotating shaft based on the inertia of the rotor or the like occurs. The trapezoidal control system is used when the position to stop the rotating shaft is predetermined.

In FIG. 6(1), an axis of abscissa denotes a time t and an axis of ordinate indicates a rotating speed of the rotating shaft of the stepping motor 17a. As shown in the diagram, after the rotation of the rotating shaft of the stepping motor 17a was started, the rotating speed of the rotating shaft is accelerated for only a predetermined time. Thereafter, the rotating speed is set to the uniform speed. After an elapse of a predetermined time, the rotating speed of the rotating shaft is decelerated and the rotating shaft of the stepping motor 17a soon stops. This speed control method is called a trapezoidal control system since a change state of the rotating speed of the rotating shaft of the stepping motor 17a shows a trapezoidal shape.

FIG. 6(2) is a diagram showing the signals $\phi_1$ to $\phi_4$ corresponding to FIG. 6(1) and relates to the case where the rotating shaft rotates forwardly. In FIG. 6(2), when the pulse is set in the rising state, a current flows through each exciting coil of the stepping motor 17a for only the time of the pulse width. When the rotating speed of the rotating shaft of the stepping motor 17a is accelerated, the interval of each pulse gradually decreases. When the rotating speed is set to the uniform speed, the interval of each pulse is set to a predetermined time. Further, when the rotating speed is decelerated, the interval of each pulse gradually increases. FIG. 6(3) is a diagram showing the CLK signal which is supplied to the drive circuit 16 and corresponds to FIG. 6(2). When the pulse interval of the CLK signal changes from a long interval to a short interval, the rotating speed of the rotating shaft of the stepping motor 17a is accelerated. When the pulse interval is constant, the rotating speed is also constant. On the contrary, when the pulse interval of the CLK signal gradually decreases, the rotating speed is decelerated.

In the conventional automatic focusing system shown in FIGS. 3 and 4, as will be understood from FIGS. 4(2) and 4(3), the pulse interval of the input pulse (CLK signal) which is supplied to the stepping motor 17 is constant. This means that the moving speed of the master lens 6 is set to be constant. On the other hand, the moving direction of the master lens 6 rapidly changes in the opposite direction. That is, in the conventional automatic focusing system, nothing is considered with respect to the out-of-step phenomenon which is caused by suddenly rotating the rotating shaft of the stepping motor 17 at a predetermined rotating speed from the stop state. In addition, no consideration is made with regard to the unnecessary vibration (ringing) which is caused by suddenly setting the rotating shaft from a predetermined rotating speed state to the stop state (or reverse state).

When the out-of-step phenomenon occurs, the rotating shaft of the stepping motor 17 does not normally rotate. Therefore, the master lens 6 which is moved by the rotation of the rotating shaft does not normally move. Thus, it is difficult to move the master lens 6 to the position corresponding to the maximum value of the high frequency component signal of the video signal. That is, the conventional system has a problem such that the accurate focusing operation cannot be performed.

On the other hand, in the conventional system, since the master lens 6 is finely vibrated with the unnecessary vibration (ringing) caused, a predetermined micro vibration cannot be correctly executed. Therefore, the detecting circuit 11 in FIG. 3 cannot normally detect the micro vibration component included in the high frequency component signal. Thus, the sync detecting circuit 15 in FIG. 3 can hardly accurately output the detection signals of the polarity and amplitude which are necessary for the focusing operation. Namely, there is a problem such that the conventional system cannot perform the accurate discrimination of the focus.

Moreover, since the master lens 6 is moved at a uniform speed even in the portion of a large inclination of the high frequency component signal of the video signal mentioned above, it takes an extra long time until the correct focus is obtained.

SUMMARY OF THE INVENTION

It is an object of the present invention to eliminate the drawbacks in the conventional automatic focusing systems mentioned above and to provide an automatic focusing system which can perform an accurate discrimination of the focus and can also accurately execute the focusing operation in a short time.

To accomplish the above object, the automatic focusing system according to the invention includes an image pickup device; an optical system which includes at least a master lens and an objective lens fixed to a predetermined position and made of plastics in which at least a part of the surface has an aspherical shape and which forms an image of an object to be photographed onto the photo sensing surface of the image pickup device; a moving apparatus for moving the master lens in its optical axis direction while finely vibrating the master lens at a predetermined reference frequency; a high frequency component extracting circuit for extracting a signal of the high frequency component from a video signal which is output from the image pickup device; a vibration component detecting circuit for extracting a signal of the component of the reference frequency from the high frequency component signal which is output from the high frequency component extracting apparatus and for detecting a polarity and an amplitude of the extracted signal; a maximum position detecting circuit for detecting the position of the maximum value of the high frequency component signal on the basis of at least the polarity detected by the vibration component detecting apparatus; a speed setting circuit for outputting a speed set signal to change a speed of the master lens for a period of time when the master lens is moved by the moving apparatus; and a control circuit for controlling the moving apparatus on the basis of an output signal of the speed setting circuit and an output signal of the maximum position detecting circuit.

That is, since the moving apparatus operates so as to change the moving speed of the master lens, the out-of-step phenomenon in the moving apparatus is prevented, the influence by the unnecessary vibration (ringing) is eliminated, and further, the operating time until the correct focus is obtained is reduced.

BRIEF DESCRIPTION OF THE DRAWINGS

FIG. 8 is a cross sectional view showing a moving mechanism of a master lens group in the invention;

FIG. 9 is a partial cross sectional view showing a moving frame and a moving frame guide rod shown in FIG. 8;

FIG. 10 is a diagram showing a first deviation of the master lens in the invention;

DESCRIPTION OF THE PREFERRED EMBODIMENTS

Figure 7:
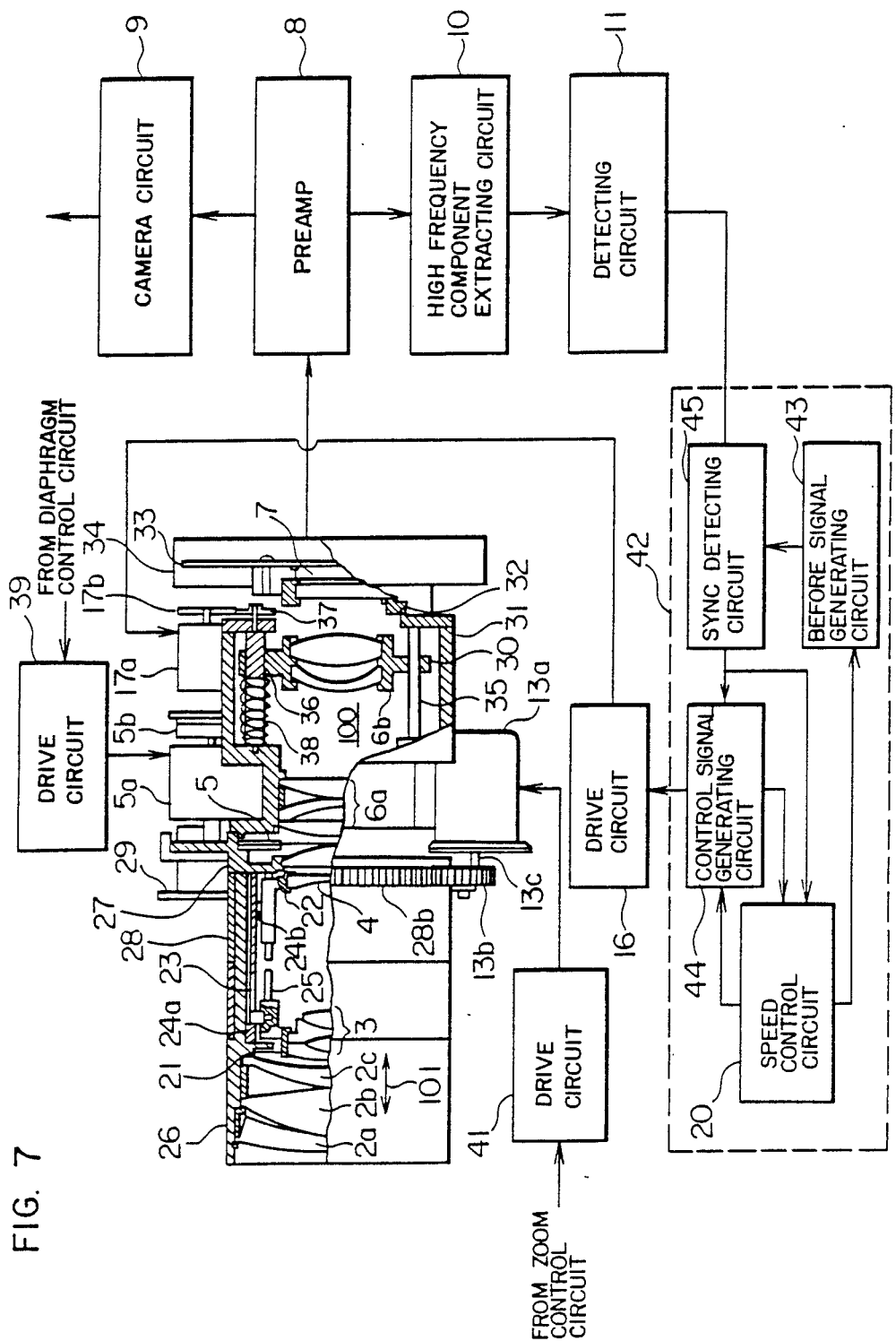
FIG. 7 is an arrangement diagram showing a typical embodiment of an automatic focusing system according to the present invention.

FIG. 7 is an arrangement diagram of an embodiment of an automatic focusing system according to the present invention.

In FIG. 7, a lens system 100 is shown as a partial cross sectional view. First, the lens system 100 to form an optical image of an object to be photographed onto the photo sensing surface (not shown) of the image pickup device 7 will be described. Reference numeral 2 denotes an objective lens group consisting of three lenses (2a, 2b, and 2c). Among the objective lens group 2, each of the lenses 2a and 2c is a plastic lens made of a plastic material and having a flange in the outer peripheral portion of the lens. One of the lens surfaces of the plastic lenses 2a and 2c has an aspherical shape. Among the objective lens group 2, the lens 2b is a glass lens made of a glass material. Reference numeral 3 denotes the variator lens group to change (variably magnifying function) the size of the optical image of the object to be photographed on the photo sensing surface of the image pickup device 7. The variator lens group 3 changes the size of the optical image by moving in its optical axis direction. Reference numeral 4 denotes the compensator lens group to compensate a distortion (aberration) of the optical image which is caused due to the movement of the variator lens group 3. Reference numeral 6 indicates the master lens (eyepiece lens) group consisting of a plurality of lens groups 6a and 6b. Among the master lens group 6, the lens group 6b is a master lens post group (hereinafter, abbreviated as the master lens group 6b) which is moved in its optical axis direction and allows the optical image to be focused onto the photo sensing surface of the image pickup device 7.

In such a lens system 100, the objective lens group 2 is generally larger and heavier than the other lenses 3, 4, and 6. In this embodiment, since the objective lenses 2a and 2c are formed as the plastic lenses, the weight of the lens system 100 is relatively light. Each of the plastic lenses 2a and 2c is formed such that the central portion (20% of the diameter) of the lens surface has a spherical shape and the outer peripheral portion (80% of the diameter) has an aspherical shape. By forming the plastic lenses 2a and 2c into such a shape, these lenses correct the aberration which is caused in the lens system 100. On the other hand, the other lens surface of each of the plastic lenses 2a and 2c has a spherical shape. Therefore, in the examination of the lens surfaces of the plastic lenses 2a and 2c, each optical axis can be set by using the lens surface on the side of the spherical shape as a reference, so that a decentering (deviation of the optical axis) or the like between the lens surfaces can be easily discriminated.

A construction of a lens mirror barrel to hold the lens system 100 will now be described. Reference numeral 21 denotes a variator frame to hold the variator lens group 3 and 22 indicates a compensator frame to hold the compensator lens group 4. Reference numeral 23 represents a cam ring to move the variator frame 21 and compensator frame 22 in an optical axis direction 101 of the lens system 100; 24a denotes a cam follower attached to the variator frame 21; and 24b is a cam follower attached to the compensator frame 22. The cam followers 24a and 24b are inserted into cam grooves (not shown) formed in the cam ring 23, respectively. Reference numeral 25 denotes a guide rod to guide the variator frame 21 and compensator frame 22 in the optical axis direction 101 of the lens system 100. Reference numeral 26 indicates a fixed barrel to support one end of the guide rod 25. The variator frame 21 and compensator frame 22 are attached to the inside of the fixed barrel 26. The fixed barrel 26 holds the cam ring 23 so that the cam ring 23 can rotate. On the other hand, the fixed barrel 26 holds the objective lens group 2. Reference numeral 27 denotes a connecting barrel to prevent that the cam ring 23 is ejected out from the inside to the outside of the fixed barrel 26. The connecting barrel 27 supports the other end of the guide rod 25.

Reference numeral 28 denotes a zoom ring which comes into engagement with the cam ring 23 through a notched groove (not shown) formed in the fixed barrel 26. The zoom ring 28 has a gear portion 28b. The gear portion 28b is in engagement with a drive gear 13b. The drive gear 13b is attached to the rotating shaft of a zoom motor 13a. The zoom motor 13a is driven by a drive circuit 41. When a signal for zooming is supplied from a zoom control circuit (not shown) to the drive circuit 41, this drive circuit drives the zoom motor 13a. When the zoom motor 13a is driven, the zoom ring 28 rotates. Reference numeral 29 denotes a zoom position detector having a gear (not shown) which is come into engagement with the gear portion 28b of the zoom ring 28. The zoom position detector 29 detects the position of the cam ring 23 which is deviated due to the movement of the zoom ring 28 and supplies a detection signal detected to the zoom control circuit. (The description of the zoom control circuit is omitted.)

Reference numeral 30 denotes a movable frame; 31 is an outer master barrel; and 32 is a sensor holding frame to hold the image pickup device 7. The sensor holding frame 32 prevents that the movable frame 30 is ejected out from the inside to the outside of he outer master barrel 31. Reference numeral 33 denotes a base plate for a signal processing circuit attached to the image pickup device 7; 34 is a shielding casing to shield the base plate 33 (and image pickup device 7); 35 is a movable frame guide rod; 36 a lead screw; 37 a gear; 38 a spring; 17b a drive gear; 5 the diaphragm apparatus to change the brightness of the light which enters the photo sensing surface of the image pickup device 7; 5a an iris motor to drive the diaphragm apparatus 5; and 5b a diaphragm position detector to indirectly detect an opening degree of the diaphragm apparatus 5. An output signal of the diaphragm position detector 5b is supplied to a control signal generating circuit 44 (the drawing and description are omitted). The iris motor 5a is driven by a drive circuit 39. When a signal for an iris is supplied from a diaphragm control circuit (not shown), the drive circuit 39 drives the iris motor 5a. (The description of the diaphragm control circuit is omitted.)

The operation of the lens group in the zooming operation will now be described hereinbelow with respect to the lens mirror barrel with the foregoing structure. (The operation of the master lens group 6b in the focusing operation will be described in FIG. 8 hereinlater.)

When a rotating shaft 13c of the zoom motor 13a rotates, the drive gear 13b attached to the rotating shaft 13c rotates. Since the gear portion 28b of the zoom ring 28 is in engagement with the drive gear 13b, the rotating force of the drive gear 13b is transferred to the zoom ring 28. Thus, the zoom ring 28 rotates. Since the cam ring 23 is in engagement with the zoom ring 28, the cam ring 23 also rotates. Since the cam followers 24a and 24b are fitted into the cam grooves of the cam ring 23, when the cam ring 23 rotates, the cam followers 24a and 24b move along the cam grooves of the cam ring 23. Since the cam grooves are formed in the optical axis direction 101 of the lens system 100, the cam followers 24a and 24b move in the optical axis direction 101. Since the cam follower 24a is attached to the variator frame 21 to hold the variator lens group 3, the variator lens group 3 moves in the optical axis direction 101. Therefore, the zooming operation is performed. On the other hand, the cam follower 24b is also attached to the compensator frame 22. The cam follower 24b moves along another cam groove different from the cam groove of the cam ring 23 to move the variator frame 21. Thus, the compensator frame 22 also moves independently of the variator frame 21. The motion of the compensator lens group 4 due to the motion of the compensator frame 22 corrects the aberration which is caused due to the movement of the variator lens group 3.

The circuit arrangement of FIG. 7 will now be described hereinbelow.

In FIG. 7, the optical image is formed on the photo sensing surface of the image pickup device 7 by the master lens (eyepiece lens) group 6b. This optical image is converted into the time sequential electric signal by the image pickup device 7. On the other hand, the preamplifier 8 amplifies an output signal of the image pickup device 7. An output signal of the preamplifier 8 is supplied to the camera circuit 9 and high frequency component extracting circuit 10. The camera circuit 9 forms a video signal on the basis of the output signal of the preamplifier 8. The camera circuit 9 outputs the video signal to the outside of the video camera main body.

The high frequency component extracting circuit 10 extracts the signal of the high frequency component corresponding to the fineness of the image from the output signal of the preamplifier 8 and outputs. When the focusing state is finely changed (fluctuated), the high frequency signal includes the signal corresponding to the micro vibration component of the master lens group 6b. The detecting circuit 11 detects the micro vibration component signal from the output signal of the high frequency component extracting circuit 10. The detecting circuit 11 outputs the detected output signal to a sync detecting circuit 45 of a main control circuit 42.

On the other hand, the drive circuit 16 drives the stepping motor 17a on the basis of a rotating direction (CW/CCW) setting signal and a pulse train (drive pulse) which are supplied from the control signal generating circuit 44 in the main control circuit 42. The stepping motor 17a is driven by an output signal of the drive circuit 16 and the master lens group 6b is moved while finely changing the focusing state by such a degree that cannot be detected by the eyes. Therefore, the output signal of the image pickup device 7 changes in correspondence to the micro vibration of the master lens group 6b.

When activating the automatic focusing system, the control signal generating circuit 44 selects a speed pattern in the case of moving the master lens group 6b while vibrating it and generates a $T_V$ setting signal corresponding to the selected speed pattern to the speed control circuit 20. Thereafter, the control signal generating circuit 44 outputs a focus on signal to set the start of the automatic focusing operation to the speed control circuit 20. When the focus on signal is supplied, the speed control circuit 20 generates a reference clock signal. The speed control circuit 20 supplies a first count signal (time coordinate) which is obtained by counting the clock signals to a reference signal generating circuit 43. On the other hand, the speed control circuit 20 supplies both of the pulse train to drive the stepping motor 17a and a second count signal obtained by counting the pulse train to the control signal generating circuit 44 on the basis of the $T_V$ setting signal supplied from the control signal generating circuit 44. Further, the speed control circuit 20 supplies the second count signal to the reference signal generating circuit 43 in the main control circuit 42.

Figure 16:
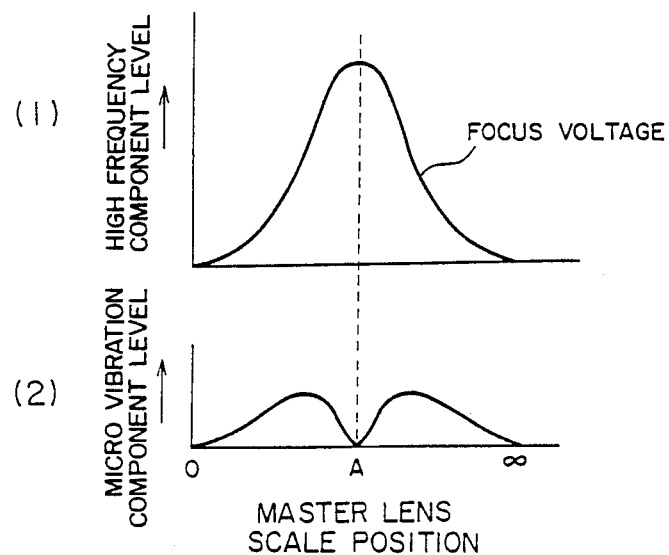
FIG. 16 is a diagram for explaining the operation of the automatic focusing system of the invention.

On the basis of the first and second count signals supplied from the speed control circuit 20, the reference signal generating circuit 43 generates a reference signal at a generation timing of the micro vibration of the master lens group 6b and supplies the reference signal to the sync detecting circuit 45. The sync detecting circuit 45 synchronously detects the signal of the micro vibration component in the high frequency component of the video signal supplied from the detecting circuit 11 by use of a reference signal supplied from the reference signal generating circuit 43. The synchronously detected signal is supplied to the control signal generating circuit 44 and speed control circuit 20. The high frequency component is as shown in FIG. 16(1).

The speed control circuit 20 discriminates a magnitude (absolute value) of an output signal of the sync detecting circuit 45 and limits the output time of the pulse train in accordance with the magnitude. However, even when the magnitude (absolute value) is zero, the time (period $T_V$) of the pulse train for the micro vibration is not limited. The absolute value in this case is as shown in FIG. 16(2).

On the other hand, the control signal generating circuit 44 determines the direction to move the master lens group 6b from the polarity of the output signal of the sync detecting circuit 45. In addition, the generating circuit 44 also decides the direction to finely vibrate the master lens group 6b from the count value of the second count signal which is supplied from the speed control circuit 20. On the basis of the results of the decision of those directions, the control signal generating circuit 44 supplies a rotating direction setting signal to set the rotating direction of the rotating shaft of the stepping motor 17a to the drive circuit 16. At the same time, the control signal generating circuit 44 supplies the pulse train supplied from the speed control circuit 20 to the drive circuit 16. The pulse train changes an interval (period) of the pulse in accordance with the selected speed pattern.

Thus, the moving speed of the master lens group 6b changes in the period of time when the master lens group 6b moves.

Therefore, if the speed pattern is properly set as will be explained hereinlater and the rotation of the rotating shaft of the stepping motor 17a is controlled, the occurrence of the out-of-step phenomenon can be prevented and the influence by the ringing of the master lens group 6b can be eliminated.

As mentioned above, the objective lenses 2a and 2c are the plastic lenses and the image forming surface of each of these lenses is shifted due to an aging change (expansion due to the moisture absorption or the like) of the plastic material and a change by temperatures. However, in this embodiment, the closed loop control is executed and a margin is provided for the moving range of the movable frame, so that even if the shift of the image forming surface occurs, the automatic focusing operation is normally executed.

The moving mechanism of the master lens group 6b shown in FIG. 7 will now be described.

FIG. 8 is a cross sectional view showing the moving mechanism of the master lens group 6b. In FIG. 8, reference numeral 30 denotes the movable frame to hold the master lens group 6b. The upper portion of the movable frame 30 is connected to the lead screw 36 and the lower portion is connected to the movable frame guide rod 35. A female screw is attached in the connecting portion with the lead screw 36. Further, the movable frame 30 is pressed in one direction by the spring 38. One end of the guide rod 35 is held to the outer master barrel 31 and the other end is held by a pressing member (pressing ring) 40. One end of the lead screw 36 is held to the outer master barrel 31 and the other end is connected to the gear 37 through a hole of the pressing member 40. The gear 37 is in engagement with the drive gear 17b. The drive gear 17b is connected to the rotating shaft of the stepping motor 17a.

Therefore, when the stepping motor 17a is driven and its rotating shaft rotates, the drive gear 17b rotates. When the drive gear 17b rotates, the gear 37 rotates. Further, when the gear 37 rotates, the lead screw 36 rotates. The rotating motion of the lead screw 36 is converted into the rectilinear motion of the movable frame 30. Thus, the movable frame 30 (and master lens group 6b) moves the master lens group 6b in its optical axis direction. The guide rod 35 prevents that the movable frame 30 rotates due to the rotation of the lead screw 36.

In the moving mechanism of FIG. 8, the cam ring is not used but the lead screw is used. Since the lead screw 36 is lighter than the cam ring, the driving force necessary for the motor to rotate the lead screw 36 is relatively small. Consequently, a relatively small motor can be used as the stepping motor 17a. The use of the small motor reduces the noises.

In FIG. 8, although the drive gear 17b and gear 37 have been arranged between the rotating shaft of the stepping motor 17a and the lead screw 36, the drive gear 17b and gear 37 can be omitted.

The connecting portion between the movable frame 30 and the movable frame guide rod 35 shown in FIG. 8 will now be simply described.

FIG. 9 is a partial cross sectional view showing the movable frame 30 and movable frame guide rod 35. In FIG. 9, reference numeral 30a denotes a notched groove of the movable frame 30. The guide rod 35 is fitted into the notched groove 30a. On the other hand, reference numeral 30b denotes a rotation stop portion of the movable frame 30. The rotation stop portion 30b prevents the rotation of the movable frame 30 due to the rotation of the lead screw 36. Since the guide rod 35 is fitted into the notched groove 30a, the rotation stop portion 30b is elastically deformed. Thus, the occurrence of a shaking of the movable frame 30 and guide rod 35 is prevented.

Figure 11:
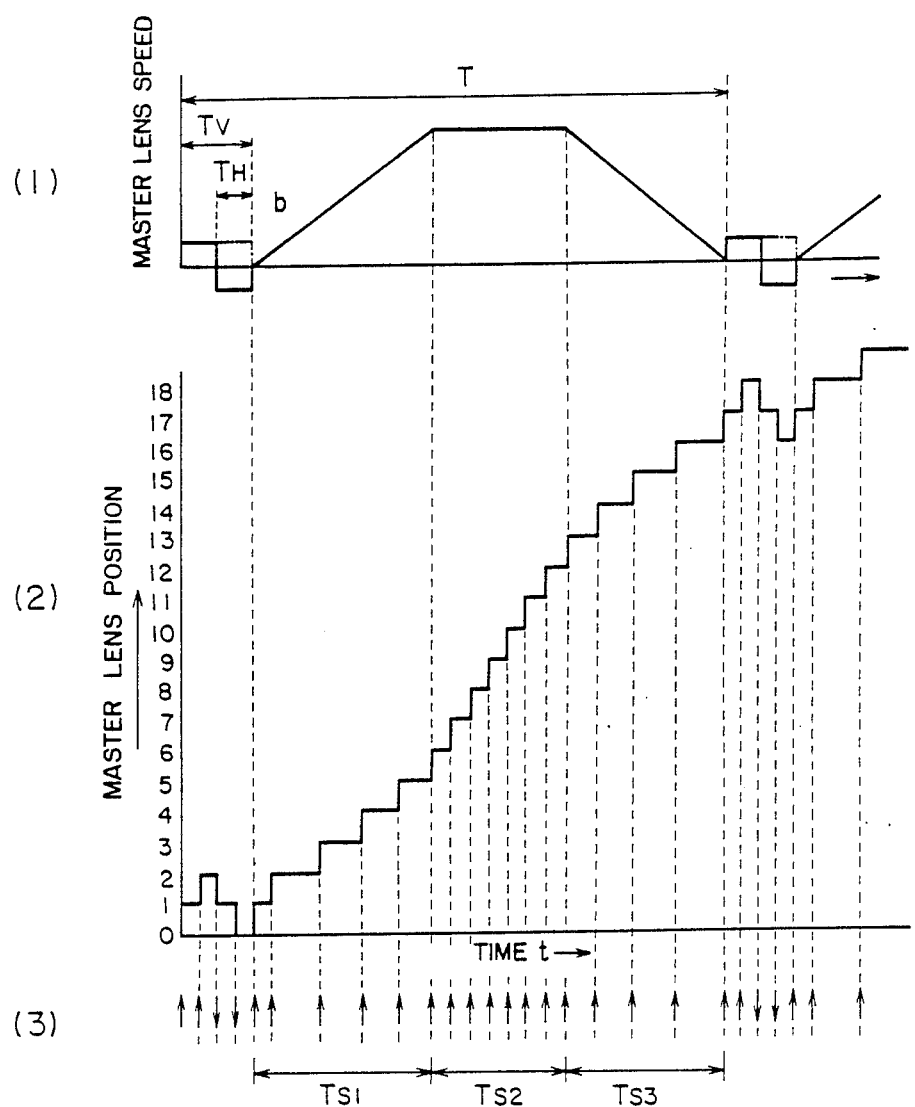
FIG. 11 is a diagram showing a second deviation and a speed of the master lens in the invention.
Figure 12:
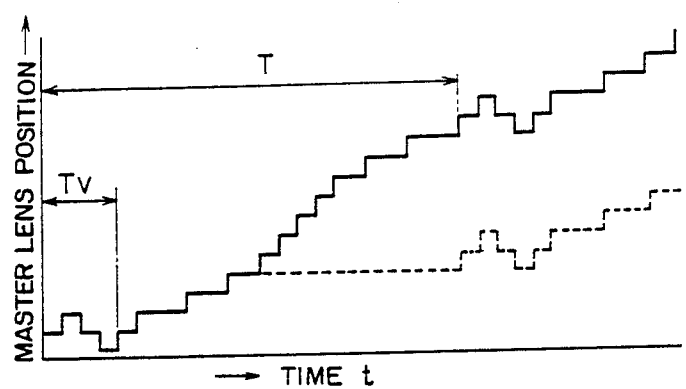
FIG. 12 is a diagram showing a third deviation of the master lens in the invention.
Figure 13:
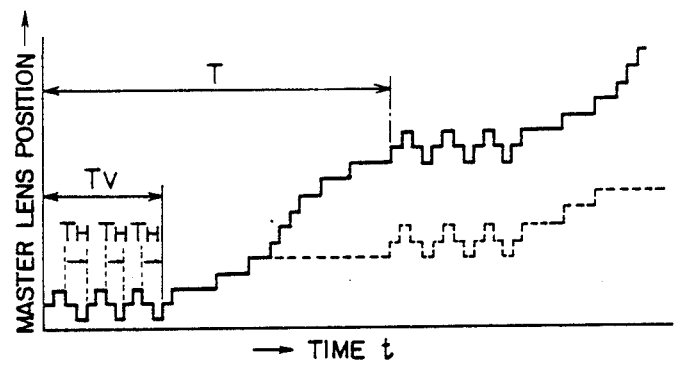
FIG. 13 is a diagram showing a fourth deviation of the master lens in the invention.

FIGS. 10 to 14 are diagrams showing examples of deviation patterns of the master lens group 6b. These diagrams show the deviation patterns which are set so as not to cause the out-of-step phenomenon of the rotation of the rotating shaft of the stepping motor 17a. These diagrams also show the deviation patterns which are set so as to eliminate the influence by the occurrence of the unnecessary vibration (ringing). FIGS. 12 and 13 show deviation patterns which are set so as to reduce the operating time of the automatic focusing system until the correct focus is obtained.

Figure 5:
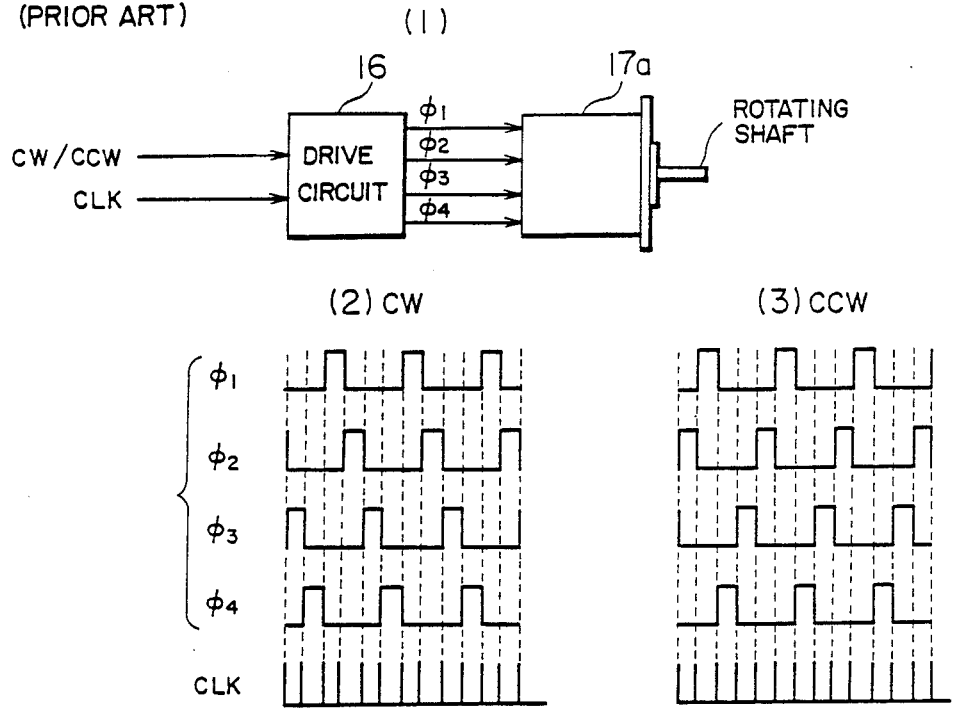
FIG. 5 is a diagram showing a typical stepping motor and a signal of a current which is supplied to a drive circuit of this motor.

FIG. 10 is the diagram showing the deviation pattern which is set so as to stop the master lens group 6b shown in FIG. 7 for only a period of time $T_C$ before the master lens group 6b is finely vibrated. In FIG. 10(1), an axis of abscissa indicates the time t and an axis of ordinate represents the position of the master lens group 6b. The position of the master lens group 6b is shown by values which are derived by dividing the distance from the infinite distance ∞ to the close range into n steps. FIG. 10(2) shows an input signal to the drive circuit 16 in FIG. 7 corresponding to the deviation of the master lens group 6b shown in FIG. 10(1). This input signal shows the generation timing of the CLK signal in FIG. 5 and the rotating direction of the rotating shaft of the stepping motor 17a by the CW/CCW signal. The rotating direction of the rotating shaft is indicated by the direction of an arrow.

In FIG. 10, the master lens group 6b is finely vibrated for the period of time $T_V$. After that, the master lens group 6b is moved for the period of time $T_M$. In the next period of time $T_C$, the master lens group 6b is stopped. After the elapse of the period of time $T_C$, the period of time $T_V$ is reset, so that the master lens group 6b is again finely vibrated.

The reason why the time period $T_C$ is set after the time period $T_M$ is because the unnecessary vibration caused at the time of the stop of the master lens group 6b (at the end time point of the period $T_M$) is attenuated within the period $T_C$ and does not exert any influence on the micro vibration of the next master lens group 6b. Thus, the focusing state can be accurately discriminated.

FIG. 11 is a diagram showing a deviation pattern in the case where the trapezoidal control system is applied to the moving period $T_M$ of the master lens group 6b. In FIG. 11(1), an axis of abscissa denotes the time t and an axis of ordinate represents the moving speed of the master lens group 6b. FIG. 11(2) is a diagram showing a change pattern of the master lens group 6b corresponding to the speed of the master lens group 6b shown in FIG. 11(1). FIG. 11(3) shows the input signal to the drive circuit 16 in FIG. 7 corresponding to the deviation of the master lens group 6b shown in FIG. 11(2) (similar to FIG. 10(2)). As shown in FIG. 11(2), the master lens group 6b is finely vibrated in one cycle for the period $T_V$ and, thereafter, it is moved. The movement of the master lens group 6b is set in the following manner. That is, in a period $T_{S1}$ of the steps 1 to 5, the time between the steps in which the master lens group 6b is moved is set so as to be gradually reduced. In a period $T_{S2}$ of the steps 6 to 12, the time between the steps in which the master lens group 6b is moved is set to an equal interval. In a period $T_{S3}$ of the steps 13 to 16, the time between the steps is set so as to be gradually increased. In other words, the moving state of the master lens group 6b is set to the accelerating state in the period $T_{S1}$ of the steps 1 to 5, it is set to the uniform speed state in the period $T_{S2}$ of the steps 6 to 12, and it is set to the decelerating state in the period $T_{S3}$ of the steps 13 to 16 (trapezoidal control system).

In this manner, by setting the moving speed of the master lens group 6b on the basis of the trapezoidal control system, the occurrence of the out-of-step phenomenon and unnecessary vibration in the rotating shaft of the stepping motor 17a can be prevented.

FIG. 12 is a diagram showing a deviation pattern of the master lens group 6b in the case where the moving speed (movement amount) of the master lens group 6b is changed in accordance with the magnitude of the high frequency component signal of the video signal. In FIG. 12, an axis of abscissa denotes the time t and an axis of ordinate indicates the position of the master lens group 6b. A solid line in the diagram indicates the case where the magnitude of the high frequency component signal is small. In this case, in a manner similar to FIG. 11(2), the master lens group 6b is moved in accordance with the trapezoidal control system after the master lens group 6b was finely vibrated for the period $T_V$. A broken line in the diagram shows an example in the case where the magnitude of the high frequency component signal is sufficiently smaller than that in the case of the solid line. In this case, after the master lens group 6b was finely vibrated for the period $T_V$, the master lens group 6b is moved to the midway in accordance with the magnitude of the high frequency component signal in a manner similar to the case of the solid line. After that, the master lens group 6b is stopped until the period T elapses. In this stop period of time, the unnecessary vibration of the rotating shaft of the stepping motor 17a which is caused immediately after the master lens group 6b was stopped is sufficiently attenuated. Therefore, no trouble occurs in the next micro vibration of the master lens group 6b. In FIG. 12, the generating state of the micro vibration relates to one cycle similarly to the case of FIG. 11(2). On the other hand, in the case shown by the broken line, the movement amount of the master lens group 6b in one period (time interval T) is small and the moving speed of the master lens group 6b when it is seen in a macro manner is slow.

FIG. 13 is a diagram showing a deviation pattern of the master lens group 6b similarly to FIG. 12. However, the generating state of the micro vibration of the master lens group 6b relates to three cycles. When the number of cycles of the micro vibration increases, the reliability of the synchronous detection by the sync detecting circuit 45 in FIG. 7 is improved.

Figure 14:
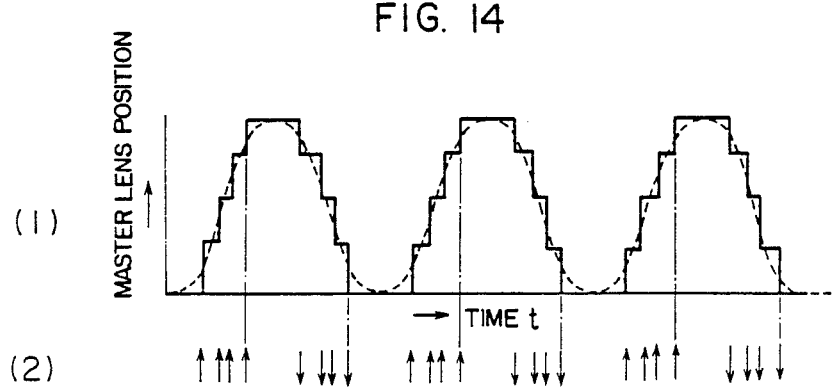
FIG. 14 is a diagram showing a fifth deviation of the master lens for a period of time $T_V$ shown in FIG. 13.

In FIG. 14, FIG. 14(1) is a diagram showing the case where the deviation pattern of the master lens group 6b shown in the period $T_V$ in FIG. 13 is approximated to a cosine wave as shown by a broken line. FIG. 14(2) shows the input signal to the drive circuit 16 in FIG. 7 corresponding to FIG. 14(1). When the micro vibration pattern of the master lens group 6b approaches the cosine wave, the extraction of the micro vibration component signal by the detecting circuit 11 in FIG. 7 becomes accurate.

Figure 15:
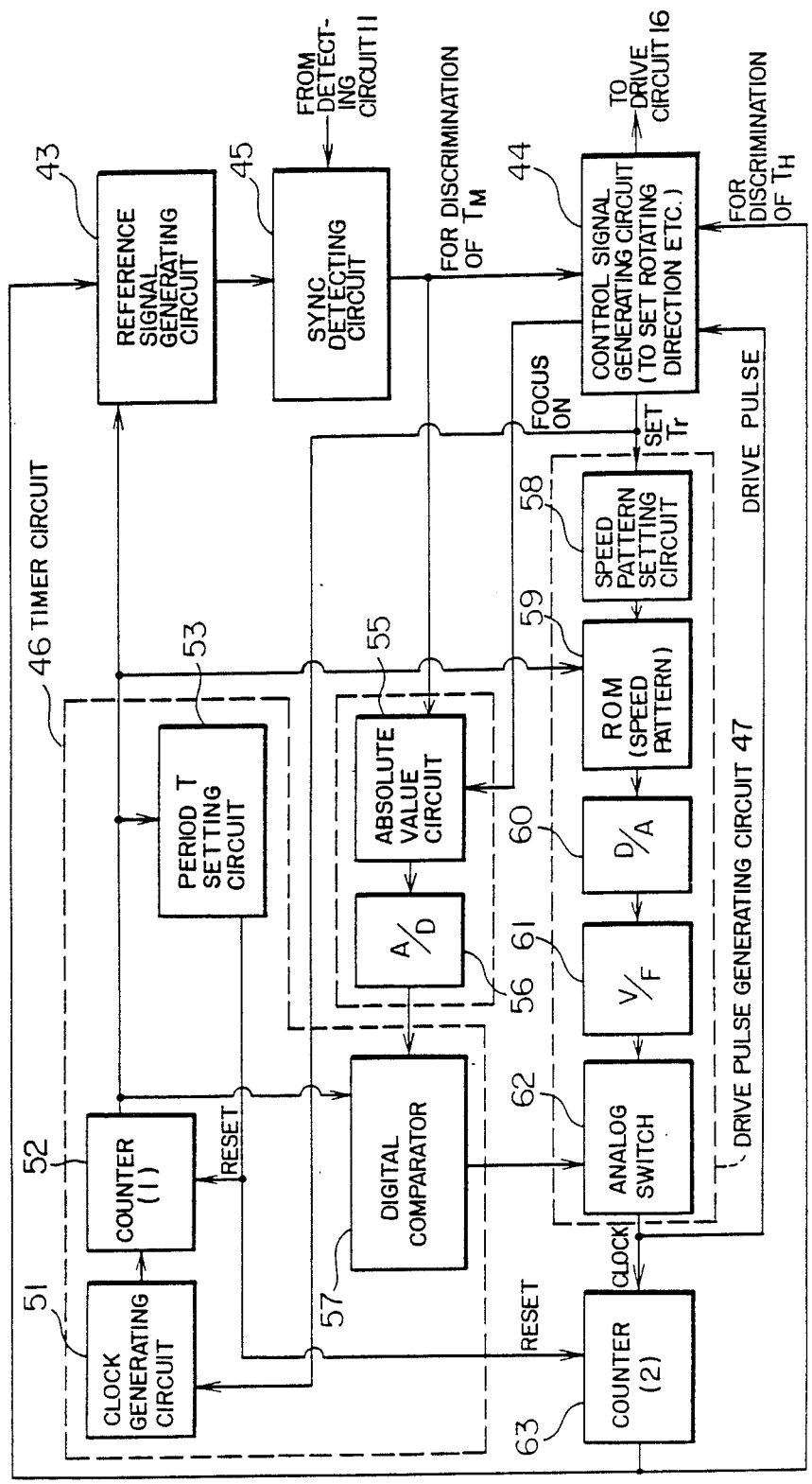
FIG. 15 is a block diagram showing an arrangement of a speed control circuit shown in FIG. 7.

FIG. 15 is a block diagram showing a detailed arrangement of the speed control circuit 20 shown in FIG. 7. In FIG. 15, the reference signal generating circuit 43, sync detecting circuit 45, and control signal generating circuit 44 in FIG. 7 are also illustrated.

In FIG. 15, reference numeral 46 denotes a timer circuit; 47 is a drive pulse generating circuit; 55 an absolute value circuit; 56 an analog/digital (A/D) converter; and 63 a counter. The timer circuit 46 comprises a clock generating circuit 51, a counter 52, a period T setting circuit 53, and a digital comparator 57. The drive pulse generating circuit 47 comprises a speed pattern setting circuit 58, read only memory (ROM) 59, a digital/analog (D/A) converter 60, a voltage/frequency (V/F) converter 61, and an analog switch 62.

It is now assumed that a power source is connected to the system of the embodiment. The control signal generating circuit 44 selects a predetermined pattern from a plurality of speed patterns as shown in FIG. 11(1) (speed patterns corresponding to the characteristics of the positions of the master lens group 6b shown in FIGS. 10(1), 11(2), and 12 to 14). The control signal generating circuit 44 supplies the $T_V$ setting signal corresponding to the speed pattern selected to the speed pattern setting circuit 58 in the drive pulse generating circuit 47. Thereafter, the control signal generating circuit 44 supplies the focus on signal to set the start of the automatic focusing operation to the clock generating circuit 51 in the timer circuit 46. When the focus on signal is supplied from the control signal generating circuit 44, the clock generating circuit 51 generates a clock signal. The clock generating circuit 51 supplies the clock signal to the counter 52.

The counter 52 counts the clock signals supplied from the clock generating circuit 51. The counter 52 supplies the count signal counted to the period T setting circuit 53 and digital comparator 57 in the timer circuit 46, to the reference signal generating circuit 43, and to the address input section of the read only memory (ROM) 59 in the drive pulse generating circuit 47. When the count value of the count signal supplied from the counter 52 has reached a predetermined value $_T$, the period T setting circuit 53 supplies a T end signal indicative of the end of the period T to the counters 52 and 63. The predetermined value $C_T$ of the period T setting circuit 53 is set in correspondence to the period T in FIGS. 10(1) to 13. Therefore, the counter 52 is reset every period T and the value of the count signal is changed from 0 to $C_T$. The digital comparator 57 compares the count signal supplied from the counter 52 with the signal supplied from the A/D converter 56. The digital comparator 57 supplies an output signal indicative of the result of the comparison to the analog switch 62 of the drive pulse generating circuit 47. When the output signal of the digital comparator 57 is in the on setting state, the analog switch 62 is turned on. When the output signal is in the off setting state, the analog switch 62 is turned off. The output signal of the digital comparator 57 can be set to the off setting state after an elapse of the period $T_V$. This operation is executed since a signal to set an initial value is supplied from the control signal generating circuit 44 to the A/D converter 56. Its detailed description and its drawing are omitted.

On the other hand, when the $T_V$ setting signal is supplied from the control signal generating circuit 44, the speed pattern setting circuit 58 supplies a chip selection signal corresponding to the $T_V$ setting signal to a chip selection input section of the ROM 59. On the basis of the chip selection signal supplied and the count signal supplied from the counter 52, the ROM 59 sequentially outputs the speed pattern data which have previously been stored to the D/A converter 60. For example, a speed pattern as shown in FIG. 11(1) is preliminary stored in the ROM 59. However, in the speed pattern of FIG. 11(1), as for the portion of the period $T_H$, the polarity inverted data as shown by an alternate long and short dash line b is previously stored in the ROM 59.

When the speed pattern data is supplied from the ROM 59, the D/A converter 60 converts the digital signal of this data into the analog signal (voltage). The D/A converter 60 supplies the analog signal to the voltage/ frequency (V/F) converter 61. In correspondence to the analog signal (voltage) supplied from the D/A converter 60, the V/F converter 61 generates a pulse train whose period changes. The V/F converter 61 outputs the pulse train generated to the analog switch 62. The pulse train which is generated from the V/F converter 61 is, for instance, a pulse train as shown in FIG. 11(3). However, this pulse train does not have a polarity.

The analog switch 62 performs the switching in response to an output signal of the digital comparator 57 and supplies its output signal to the counter 63 and control signal generating circuit 44. Therefore, the pulse train which is output from the V/F converter 61 is supplied to the counter 63 and generating circuit 44 only when the analog switch 62 is turned on. The counter 63 counts the pulse train supplied from the V/F converter 61 through the analog switch 62. The counter 63 supplies the count signal indicative of the count value to the reference signal generating circuit 43 and control signal generating circuit 44. The counter 63 is reset by the T end signal supplied from the period T setting circuit 53. On the basis of the count signals supplied from the counters 52 and 63, the reference signal generating circuit 43 generates a reference signal synchronized with the micro deviation (micro vibration) of the master lens group 6b for the period $T_V$. The reference signal generating circuit 43 supplies the reference signal generated to the sync detecting circuit 45.

On the other hand, the high frequency component in the video signal as shown in FIG. 16(1) is extracted by the high frequency component extracting circuit 10 and the micro vibration component is supplied from the detecting circuit 11 to the sync detecting circuit 45. The sync detecting circuit 45 synchronously detects the micro vibration component by using the reference signal supplied from the reference signal generating circuit 43. An output signal of the sync detecting circuit 45 is supplied to the control signal generating circuit 44 and absolute value circuit 55. The absolute value circuit 55 generates the absolute value of the output signal of the sync detecting circuit 45 and supplies the absolute value signal as shown in FIG. 16(2) to the A/D converter 56. The absolute value circuit 55 includes an amplifier (not shown). The gain of this amplifier is properly set by a gain setting signal supplied from the control signal generating circuit 44. The A/D converter 56 converts the analog absolute value signal supplied into the digital signal and outputs to the digital comparator 57 in the timer circuit 46.

Thus, when the counter 52 is reset by the T end signal, the digital comparator 57 supplies the output signal as an turn-on signal to the analog switch 62. When the count value (magnitude of the count signal) of the counter 52 is equal to the absolute value of the amplitude of the micro vibration component (magnitude of the binarized absolute value signal), the digital comparator 57 switches its output signal to the turn-off signal. Therefore, the pulse train based on the speed pattern stored in the ROM 59 is supplied to the counter 63 and control signal generating circuit 44 for only a short time as the amplitude of the micro vibration component is small. (In this case, the position of the master lens group 6b is deviated as shown by broken lines in FIGS. 12 and 13.)

Figure 6:
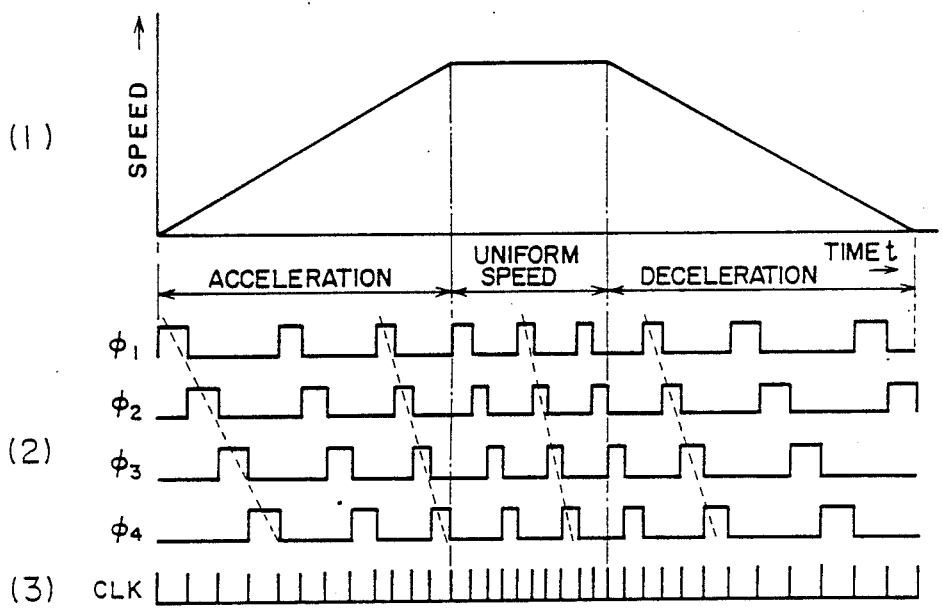
FIG. 6 is a diagram for explaining a typical speed control method of a rotating speed in the case of driving the stepping motor.

The control signal generating circuit 44 outputs the pulse train (drive pulse corresponding to the CLK signal in FIGS. 5 and 6) which is supplied from the analog switch 62 to the drive circuit 16. However, the control signal generating circuit 44 does not allow the pulse train to pass but controls the transmission of the pulse train in accordance with the various conditions and counts the pulse train, thereby discriminating the position of the master lens group 6b (the detailed description is omitted). The control signal generating circuit 44 discriminates the period $T_H$ as shown in FIG. 11 on the basis of the count signal from the counter 63 and supplies the rotating direction (CW/CCW) setting signal to the drive circuit 16 so as to reverse the rotating direction of the rotating shaft of the stepping motor 17a. Further, on the basis of the polarity of the output signal of the sync detecting circuit 45, the control signal generating circuit 44 discriminates the rotating direction of the rotating shaft of the stepping motor 17a in the period $T_M$ as shown in FIG. 10(1). In correspondence to the result of the discrimination, the control signal generating circuit 44 supplies the rotating direction setting signal to set the rotating direction of the rotating shaft to the drive circuit 16.

The speed control circuit 20 executes the operations described in FIG. 7 with the foregoing construction.

As shown by the broken lines in FIGS. 12 and 13, in the case of stopping the movement of the master lens, it is preferable to stop it by using a predetermined stop pattern. In this case, it is also possible to construct such as to shift to the decelerating period by excluding the uniform speed period. This construction can be easily accomplished by constructing such that the control signal generating circuit 44 supplies an address signal to an address in the ROM 59 to thereby change the output data from the ROM 59, and the turn-on signal is supplied to the analog switch 62.

Figure 1:
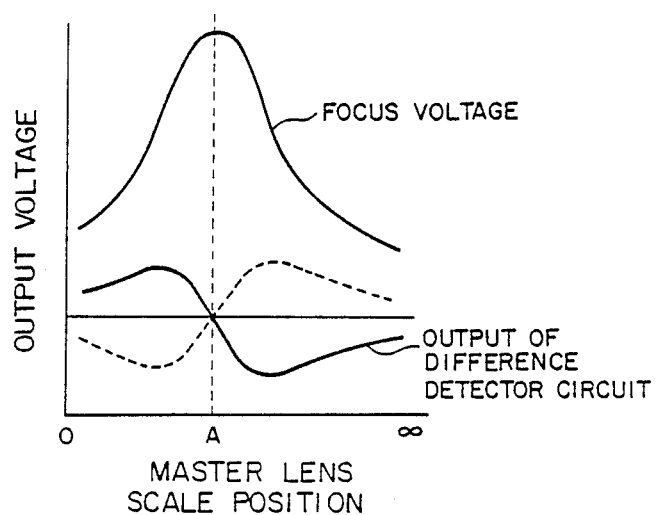
FIG. 1 is a diagram for explaining the operation of a conventional first automatic focusing system.
Figure 2:
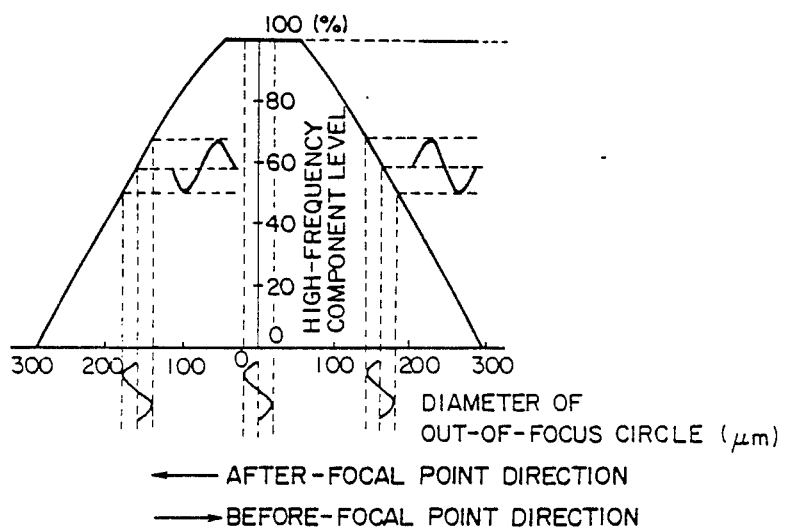
FIG. 2 is a diagram for explaining the operation of conventional second and third automatic focusing systems.
Figure 3:
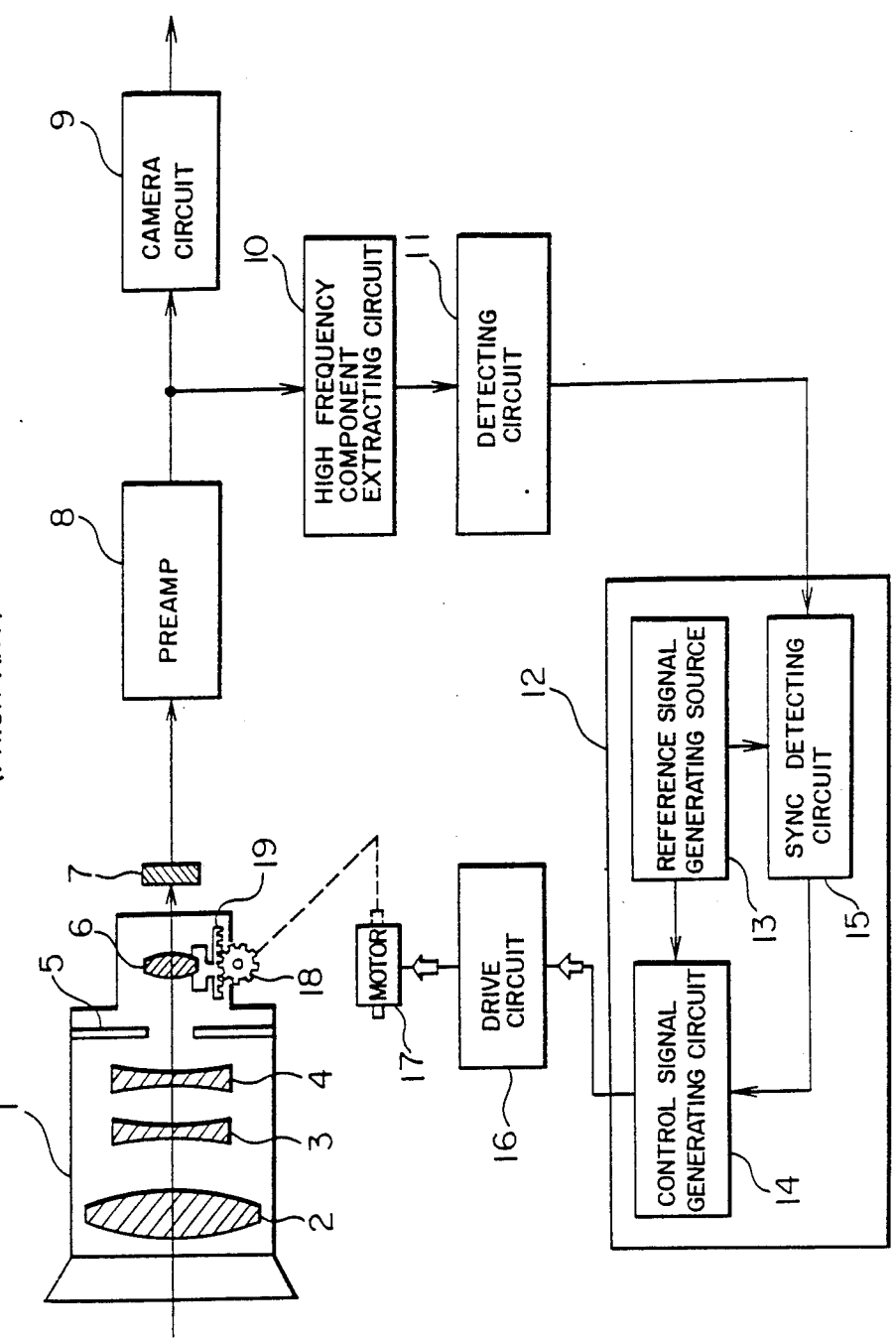
FIG. 3 is an arrangement diagram showing a fourth example of a conventional automatic focusing system.
Figure 4:
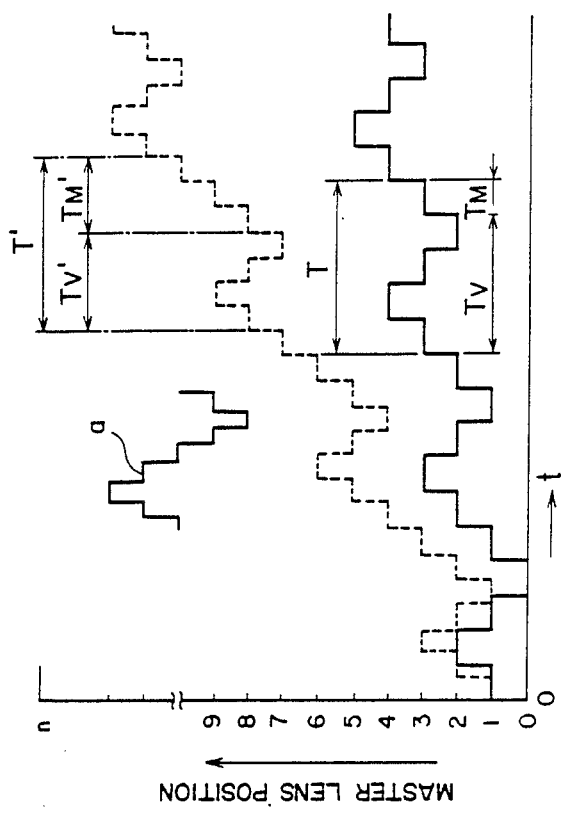
FIG. 4 is a diagram showing a deviation of a master lens in the automatic focusing system in FIG. 3.

FIG. 16 is a diagram showing the output signal (focus voltage) of the high frequency component extracting circuit 10 in FIG. 7 and the output signal of the absolute value circuit 55 in FIG. 15 with respect to the position of the master lens group 6b. FIG. 16(1) is a diagram similar to the focus voltage in FIG. 1. That is, assuming that the object to be photographed is located at a position of A (m) away from the camera, the signal (focus voltage) of the high frequency component indicates the maximum value when the master lens group 6b is located at the position A to correctly focus the object. In FIG. 16(2), an axis of abscissa denotes the position of the master lens group 6b and an axis of ordinate indicates the level (magnitude) of the signal of the micro vibration component which is output from the absolute value circuit 55. As shown in FIG. 16(2), the level of the micro vibration component signal exhibits the maximum value at the position where the inclination of the graph shown in FIG. 16(1) becomes maximum. On the other hand, at the focus position A, the level of the micro vibration component signal becomes zero.

Figure 17:
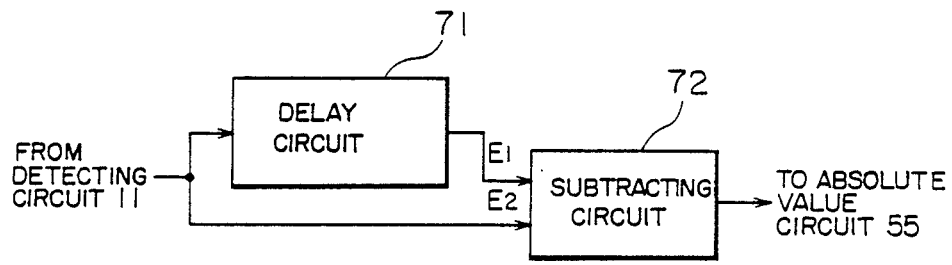
FIG. 17 is a block diagram for explaining another arrangement of the speed control circuit shown in FIG. 7.

FIG. 17 is a diagram showing a delay differentiating circuit. In FIG. 17, a delay circuit 71 delays an input signal $E_2$ by only a predetermined time and supplies the delayed signal $E_1$ to a subtracting circuit 72. The subtracting circuit 72 subtracts the signal $E_1$ from the input signal $E_2$ and outputs the signal of the result of the subtraction. The automatic focusing system of the invention can be also realized even by using such a delay differentiating circuit of FIG. 17. That is, the output signal of the detecting circuit 11 in FIG. 7 is supplied to the delay differentiating circuit of FIG. 17 and an output signal of the delay differentiating circuit is directly supplied to the absolute value circuit 55 in FIG. 15. In this case, the output signal of the sync detecting circuit 45 is supplied to only the control signal generating circuit 44 The delay time of the delay circuit 71 is set to the same time as the period of the micro vibration of the master lens group 6b. Further, the absolute value circuit 55 in FIG. 15 needs to output the amplitude of the output signal of the subtracting circuit 72.

Figure 18:
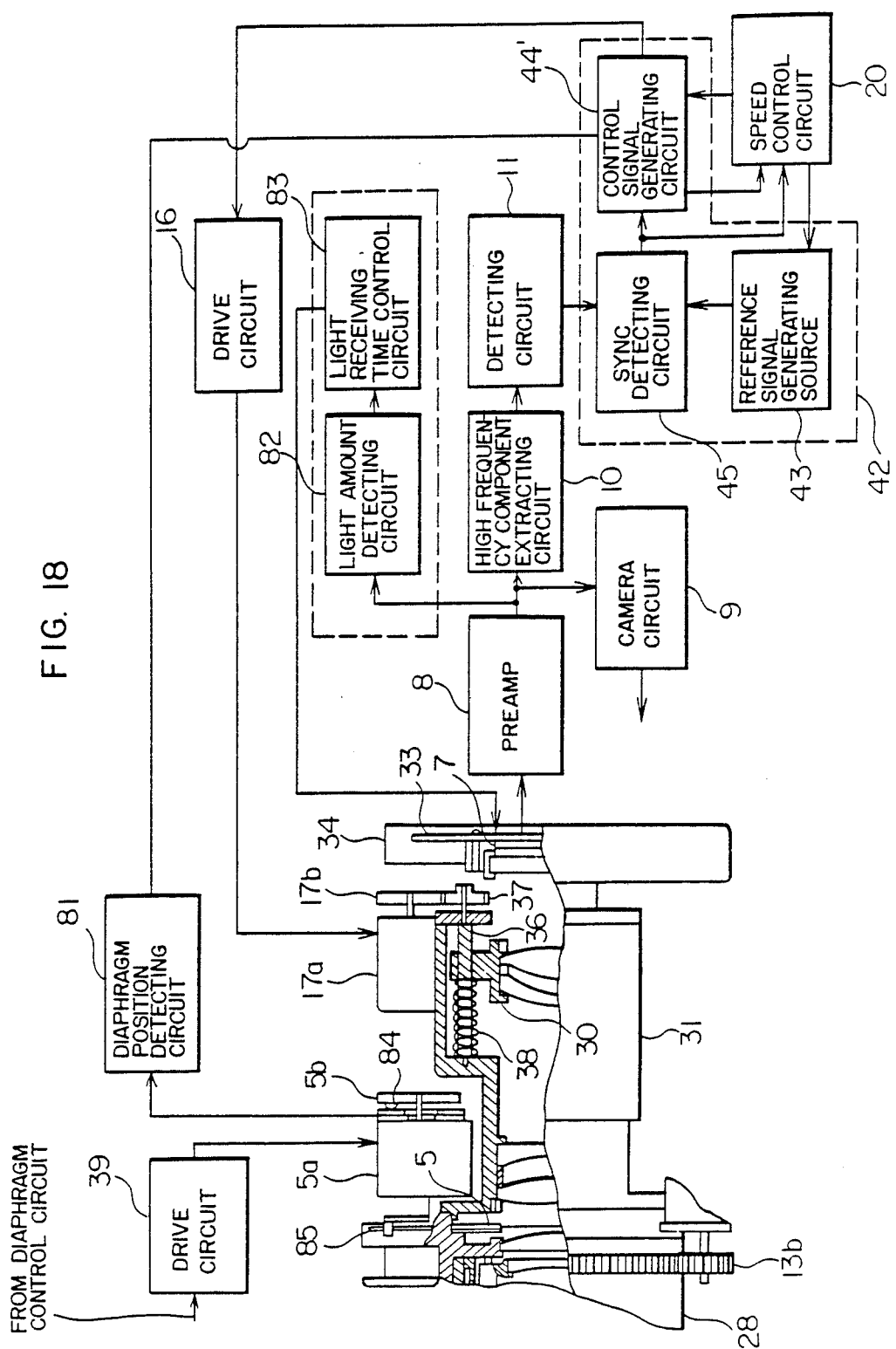
FIG. 18 is an arrangement diagram showing a second embodiment of an automatic focusing system according to the invention.

Another embodiment of the invention is shown in FIG. 18. In FIG. 18, the same parts and components as those in FIG. 7 are designated by the same reference numerals. The difference from FIG. 7 will now be described hereinbelow with reference to FIG. 18.

In FIG. 18, reference numeral 84 denotes a brush of a rotating wheel attached to the rotating shaft of the iris motor 5a. The diaphragm position detector 5b outputs a signal of a resistance value corresponding to the opening degree of the diaphragm apparatus 5 on the basis of a resistance pattern (not shown) attached to the casing of the iris motor 5a. Reference numeral 85 denotes a diaphragm member to set the state of a diaphragm blade (not shown) to determine the diaphragm value (opening degree) of the lens system. The diaphragm member is fixed to the rotating shaft of the iris motor 5a. When the rotating shaft of the iris motor 5a rotates, the diaphragm member 85 also operates (rotates). The opening degree of the lens system is determined by the operation of the diaphragm member 85. At the same time, the brush 84 rotates in contact relation with the resistance pattern of the diaphragm position detector 5b. The resistance value which is detected by the diaphragm position detector 5b changes in correspondence to the position on the resistance pattern of the brush 84. There is a one-to-one corresponding relation between the resistance value and the diaphragm value.

The diaphragm position detector 5b supplies the signal of the resistance value corresponding to the state (opening degree) of the diaphragm apparatus 5 to a diaphragm position detecting circuit 81. The detecting circuit 81 generates a diaphragm value signal indicative of a diaphragm value on the basis of a change amount of the resistance value supplied from the diaphragm position detector 5b. The detecting circuit 81 supplies the diaphragm value signal to a control signal generating circuit 44' of the main control circuit 42. The control signal generating circuit 44' discriminates a depth of field on the basis of the diaphragm value signal supplied from the detecting circuit 81. When the diaphragm is set to the deep state (namely, when the opening degree is reduced), the depth of field becomes deep. When the depth of field becomes deep, the focusing distance range to the object increases. Therefore, even if an amount of light which is received by the image pickup device 7 is constant, the high frequency component of the video signal which is output from the image pickup device 7 increases. When the high frequency component increases, the magnitude of the absolute value of the micro vibration component shown in FIG. 16(2) changes. Therefore, the moving speed of the master lens group 6b changes, so that there occurs the case where the speed is out of the proper speed control state.

Therefore, the control signal generating circuit 44' performs the correction so as not to be deviated from the proper speed control state on the basis of the result of the discrimination of the depth of field. That is, the control signal generating circuit 44' changes the gain setting signal which is supplied to the absolute value circuit 55 of the speed control circuit 20. When the depth of field is deep, the gain setting signal is set so as to reduce the gain (amplification factor) of the absolute value circuit 55. Thus, it is prevented that the moving speed of the master lens group 6b extremely increases.

On the other hand, the level (magnitude) of the video signal which is output from the image pickup device 7 rises with an increase in amount of light which is received by the image pickup device 7, so that the high frequency component of the video signal increases. Therefore, similarly to the case mentioned above, the magnitude of the absolute value of the micro vibration component shown in FIG. 16(2) changes. To solve this problem, in FIG. 18, means which will be explained hereinafter is used. That is, the output signal of the preamplifier 8 is also supplied to a light amount detecting circuit 82. The detecting circuit 82 integrates the signal supplied from the preamplifier 8 for one field period (or one frame period). The detecting circuit 82 outputs the integrated light amount signal to a light receiving time control circuit 83.

When the light amount signal supplied from the light amount detecting circuit 82 increases, the control circuit 83 generates a pulse signal whose pulse width decreases. The control circuit 83 outputs this pulse signal to the image pickup device 7. In accordance with the pulse width of the pulse signal supplied from the control circuit 83, the image pickup device 7 changes an output amount of the video signal per pixel (not shown). Namely, when the pulse width decreases, the output amount of the video signal is reduced. Thus, the level (magnitude) of each frame of the video signal which is output from the image pickup device 7 becomes constant. Therefore, it is prevented that the magnitude (amount) of the high frequency component changes due to the amount of light which is received by the image pickup device.

The second embodiment of the moving mechanism of the master lens group 6b will now be described.

Figure 19:
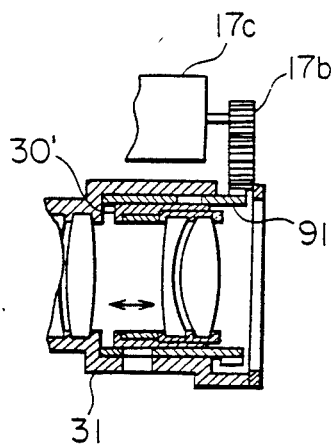
FIG. 19 is a cross sectional view showing a second moving mechanism of a master lens group in the invention.

FIG. 19 is a cross sectional view showing the second moving mechanism to move the master lens group 6b. In FIG. 19, reference numeral 30' denotes a movable frame to hold the master lens group 6b. The movable frame 30' is in engagement with an inner master barrel 91. A gear (not shown) is attached to a part of the outer periphery of the inner master barrel 91. This gear portion is in engagement with the drive gear 17b. On the other hand, the drive gear 17b is connected to the rotating shaft of the stepping motor 17a. The inner master barrel 91 is provided in the inside of the outer master barrel 31. Further, a cam follower (not shown) is attached to the movable frame 30'. A cam groove (not shown) into which the cam follower is fitted is formed in the inner master barrel 91. The cam groove is formed in parallel with the optical axis of the master lens group 6b.

In such a moving mechanism, when the stepping motor 17a is driven and its rotating shaft rotates, the drive gear 17b rotates. When the drive gear 17b rotates, the inner master barrel 91 rotates. Due to the rotation of the inner master barrel 91, the cam follower attached to the movable frame 30' moves along the cam groove of the inner master barrel 91. Thus, the movable frame 30' having the cam follower moves in parallel with the optical axis of the master lens 6b.

Figure 20:
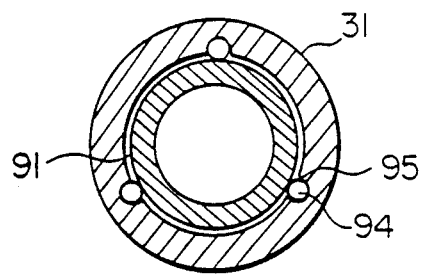
FIG. 20 is a partial cross sectional view showing cylindrical rollers arranged between an inner master barrel and an outer master barrel shown in FIG. 19.

FIG. 20 shows the case where cylindrical rollers are provided to reduce the drive force which is necessary for the motor to rotate the inner master barrel 91.

FIG. 20 is a partial cross sectional view showing an arrangement of the cylindrical rollers. In FIG. 20, reference numeral 95 denotes a U-shaped groove formed in the outer master barrel 31. This groove is formed at three positions. Cylindrical rollers 94 are respectively assembled into the U-shaped grooves 95, respectively. The inner master barrel 91 is held by the three cylindrical rollers 94. By using such a holding method, the drive force necessary for the motor to rotate the inner master barrel 91 decreases. Therefore, a relatively small motor is used as the stepping motor 17a.

Figure 21:
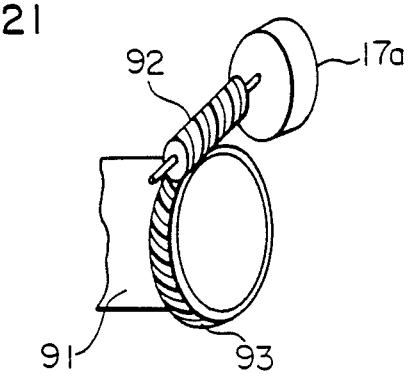
FIG. 21 is a perspective view showing the second moving mechanism to rotate the inner master barrel 91 shown in FIG. 19.

Another embodiment of the moving mechanism to rotate the inner master barrel 91 shown in FIG. 19 is shown in FIG. 21 and will now be described.

FIG. 21 is a perspective view showing the second moving mechanism to rotate the inner master barrel 91. In FIG. 21, reference numeral 93 denotes a worm wheel attached to the inner master barrel 91. The worm wheel 93 is come into engagement with a worm gear 92. The worm gear 92 is connected to the rotating shaft of the stepping motor 17a. By providing the worm gear 92 and worm wheel 93, the reduction ratio of the rotation from the rotating shaft of the stepping motor 17a to the inner master barrel 91 increases. Therefore, the drive force which is needed for the stepping motor 17a to rotate the inner master barrel 91 decreases. Consequently, a relatively small motor can be used as the stepping motor 17a.

We claim:

1. An automatic focusing system comprising:
an image pickup device;
image forming means which includes at least a master lens and an objective lens and forms an image of an object to be photographed onto a photo sensing surface of said image pickup device;
moving means for moving said master lens in its optical axis direction while finely vibrating said master lens at a predetermined reference frequency;
high frequency component extracting means for extracting a high frequency component signal from a video signal which is output from said image pickup device;
vibration component detecting means for extracting a signal of a component based on said reference frequency from the high frequency component signal which is output from said high frequency component extracting means and for detecting a polarity and an amplitude of said extracted signal;
maximum position detecting means for detecting a position of the maximum value of the high frequency component signal on the basis of at least the polarity detected by said vibration component detecting means;
speed setting means for outputting a speed setting signal to change a speed of said master lens for a period of time when said master lens is moved by said moving means; and
control means for controlling said moving means on the basis of an output signal of said speed setting means and an output signal of said maximum position detecting means.

2. A system according to claim 1, wherein said moving means includes:
a motor which receives a pulse train and rotates its rotating shaft;
a lead screw to which a rotating force of said rotating shaft is transferred and which rotates,
a master lens holding frame which has a screw portion adapted to be come into engagement with said lead screw and which holds the master lens, and
a guide member to guide said master lens holding frame in said optical axis direction.

3. An automatic focusing system comprising:
an image pickup device;
image forming means which includes at least a master lens and an objective lens and forms an image of an object to be photographed onto a photo sensing surface of said image pickup device;
moving means for moving said master lens in its optical axis direction while finely vibrating said master lens at a predetermined reference frequency;
high frequency component extracting means for extracting a high frequency component signal from a video signal which is output from said image pickup device;
vibration component detecting means for extracting a signal of a component based on said reference frequency from the high frequency component signal which is output from said high frequency component extracting means and for detecting a polarity and an amplitude of said extracted signal;
maximum position detecting means for detecting a position of the maximum value of the high frequency component signal on the basis of at least the polarity detected by said vibration component detecting means;
speed setting means for outputting a speed setting signal to change a speed of said master lens for a period of time when said master lens is moved by said moving means;
control means for controlling said moving means on the basis of an output signal of said speed setting means and an output signal of said maximum position detecting means; and
wherein said speed setting means outputs the speed setting signal in accordance with a signal of the amplitude detected by said vibration component detecting means which is supplied from said vibration component detecting means.

4. An automatic focusing system comprising:
an image pickup device;
image forming means which includes at least a master lens and an objective lens and forms an image of an object to be photographed onto a photo sensing surface of said image pickup device;
moving means for moving said master lens in its optical axis direction while finely vibrating said master lens at a predetermined reference frequency;
high frequency component extracting means for extracting a high frequency component signal from a video signal which is output from said image pickup device;
vibration component detecting means for extracting a signal of a component based on said reference frequency from the high frequency component signal which is output from said high frequency component extracting means and for detecting a polarity and an amplitude of said extracted signal;
maximum position detecting means for detecting a position of the maximum value of the high frequency component signal on the basis of at least the polarity detected by said vibration component detecting means;
speed setting means for outputting a speed setting signal to change a speed of said master lens for a period of time when said master lens is moved by said moving means;
control means for controlling said moving means on the basis of an output signal of said speed setting means and an output signal of said maximum position detecting means; and wherein said speed setting means outputs the speed setting signal on the basis of a function of a cosine wave including a bias component for allowing micro vibration of said master lens to be generated by said moving means.

5. A system according to claim 1, wherein said objective lens is a plastic lens which is fixed in a predetermined position and in which at least a part of its surface has an aspherical shape.

* * * * *